United States Patent
Bogle

(10) Patent No.: US 9,708,126 B2
(45) Date of Patent: Jul. 18, 2017

(54) CONVEYOR BELT AND MODULE WITH MAGNETS

(75) Inventor: David W. Bogle, Round Rock, TX (US)

(73) Assignee: Laitram, L.L.C., Harahan, LA (US)

( * ) Notice: Subject to any disclaimer, the term of this patent is extended or adjusted under 35 U.S.C. 154(b) by 635 days.

(21) Appl. No.: 13/982,349

(22) PCT Filed: Jan. 11, 2012

(86) PCT No.: PCT/US2012/020868
§ 371 (c)(1),
(2), (4) Date: Jul. 29, 2013

(87) PCT Pub. No.: WO2012/102857
PCT Pub. Date: Aug. 2, 2012

(65) Prior Publication Data
US 2013/0306445 A1    Nov. 21, 2013

Related U.S. Application Data

(60) Provisional application No. 61/436,667, filed on Jan. 27, 2011.

(51) Int. Cl.
*B65G 15/30* (2006.01)
*B65G 17/06* (2006.01)
*B65G 17/46* (2006.01)
*B65G 15/58* (2006.01)
*B65G 17/08* (2006.01)

(52) U.S. Cl.
CPC ........... *B65G 15/30* (2013.01); *B65G 17/086* (2013.01); *B65G 2207/24* (2013.01)

(58) Field of Classification Search
None
See application file for complete search history.

(56) References Cited

U.S. PATENT DOCUMENTS

| 4,981,208 | A | | 1/1991 | Jones |
| 5,199,551 | A | * | 4/1993 | Wallaart ............ B65G 21/2009 198/805 |
| 5,738,205 | A | | 4/1998 | Draebel |
| 5,890,583 | A | * | 4/1999 | Garbagnati ........ B65G 21/2009 198/805 |
| 6,050,397 | A | * | 4/2000 | Kato et al. .................... 198/853 |
| 6,196,381 | B1 | * | 3/2001 | Kato ...................... B65G 17/08 198/851 |
| 6,382,405 | B1 | * | 5/2002 | Palmaer ............... B65G 17/086 198/850 |
| 6,971,507 | B2 | | 12/2005 | Forman |
| 2006/0011093 | A1 | | 1/2006 | Jensen et al. |
| 2009/0308716 | A1 | | 12/2009 | Marsetti |

(Continued)

OTHER PUBLICATIONS

International Search Report and Written Opinion of the International Searching Authority, PCT/US2012/020868, mailed May 1, 2012, USPTO, Alexandria, Virginia.

*Primary Examiner* — Kavel Singh
(74) *Attorney, Agent, or Firm* — James T. Cronvich

(57) ABSTRACT

A modular radius conveyor belt having magnetic material in adjacent belt rows, including magnets in selected rows of belt modules. Magnets in one belt row attract magnets or paramagnetic material in adjacent rows to prevent vibration between rows that could shake a conveyed article out of its preferred position or orientation on the conveyor belt.

14 Claims, 2 Drawing Sheets

(56) References Cited

U.S. PATENT DOCUMENTS

2010/0012469 A1   1/2010  Szarkowski et al.
2011/0062001 A1*  3/2011  Garbagnati .......... B65G 17/086
                                                  198/851

* cited by examiner

CONVEYOR BELT AND MODULE WITH MAGNETS

BACKGROUND

The invention relates generally to power-driven conveyors and more particularly to modular radius conveyor belts having magnets to prevent vibration between consecutive rows of belt modules.

Side-flexing, or radius, conveyor belts are used to convey articles on a conveying path that includes turns. Modular plastic radius conveyor belts, such as the INTRALOX® Series 2600 SPIRALOX® 1.1 Radius belt manufactured and sold by Intralox, L.L.C. of Harahan, La., U.S.A., are constructed of a series of rows of belt modules linked together end to end at interleaved hinge eyes forming hinge joints. When negotiating a turn, these radius belts collapse at the inside of the turn because the travel path at the edge of belt at the inside of the turn is shorter than the path of the opposite edge at the outside of the turn. Because all the belt tension passes through the outside edge portion of the belt, the outside edge is fully expanded and stretched tight, while the collapsed inside edge is free of tension. Unlike the taut outside edges of the belt rows, the untensioned inside edges are free to move relative to each other in the direction of belt travel. As the inside edges of the rows rub along the inside rail or the side of a drive tower in a spiral conveyor, they tend to stick and release continuously. As they do so, they bump into each other as the belt advances. The bumping causes the belt edges to chatter and the belt to vibrate, which can cause conveyed articles to change their orientations atop the belt. In many applications, product orientation is important. And chatter is annoying.

Thus, there is a need for a conveyor belt that does not vibrate enough to change product orientation. And there is a need to reduce chatter in radius and spiral belts.

SUMMARY

These needs and others are addressed by a modular conveyor belt embodying features of the invention. One version of such a conveyor belt comprises a series of rows of one or more belt modules hingedly linked together at hinge joints that extending transverse to a direction of belt travel from a first side edge of the rows to an opposite second side edge. Magnetic material is disposed in selected rows. At least some of the selected rows are magnet rows in which the magnetic material in each magnet row comprises a first magnet arranged to attract the magnetic material in an adjacent selected row.

In another aspect of the invention, a conveyor belt module comprises a first hinge end and an opposite second hinge end that define first and second hinge axes extending transverse to a travel direction between first and second side edges. At least one magnet has a polar axis parallel to the travel direction.

BRIEF DESCRIPTION OF THE DRAWINGS

These aspects and features of the invention, as well as its advantages, are described in more detail in the following description, appended claims, and accompanying drawings, in which:

DETAILED DESCRIPTION

Figure 1:
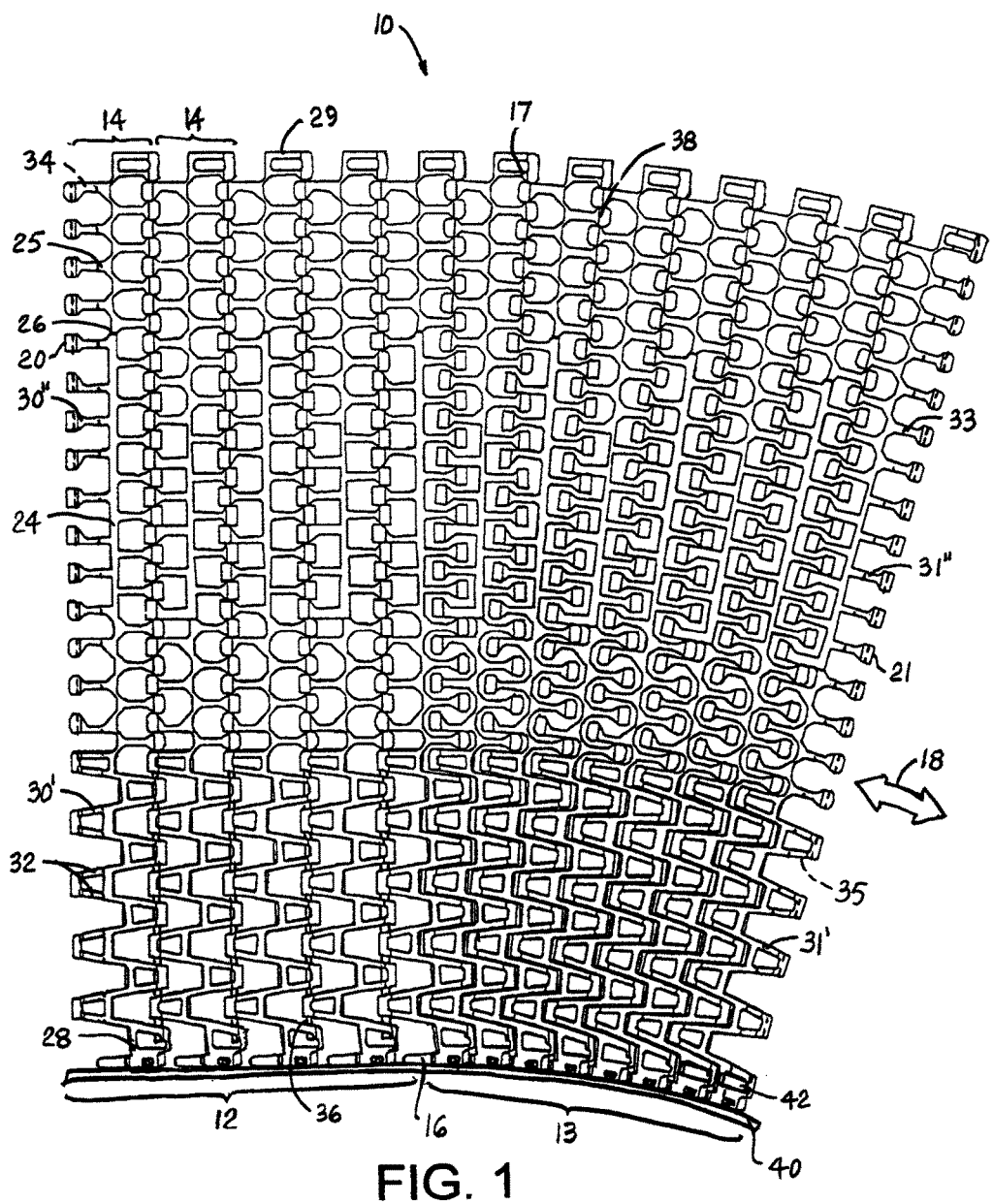
FIG. 1 is a bottom plan view of a portion of one version of a modular radius conveyor belt embodying features of the invention.

A portion of a modular plastic conveyor belt embodying features of the invention is shown in the bottom plan view of FIG. 1. The conveyor belt 10 shown is a radius, or side-flexing, belt following a conveying path that includes straight 12 and curved 13 segments. The belt is constructed of a series of rows 14 of belt modules. Each row extends laterally across the width of the belt from a first side edge 16 to a second side edge 17 and, in the direction of belt travel 18, from a leading end 20 to an opposite trailing end 21 when the belt is traveling to the left in FIG. 1. (The descriptors "leading" and "trailing" are not meant to limit the belt to a certain direction of travel, but merely to help describe the general spatial relationships of various elements of the example versions described.) Each belt row 14 is made up of a number of belt modules arranged side by side. In this example, a row includes a first side edge module 24 and a second side edge module 25 separated at a seam 26. Internal modules (not shown), formed without belt edge structure, could be positioned between the two side edge modules in a row to form a wider belt. And, even though each row in FIG. 1 includes more than one belt module, each row could be formed of a single module that has side-edge structure 28, 29 at both edges. Consecutive side edge modules are cut to different widths to construct the belt in a bricklay pattern. The belt modules are, for example, injection-molded out of a thermoplastic polymer, such as polyethylene, polypropylene, acetal, nylon, or a composite resin.

Each row 14 of the conveyor belt 10 has a set of leading projections 30', 30" spaced apart laterally along the leading end 20 and a set of trailing projections 31', 31" spaced apart laterally along the trailing end 21. The leading and trailing projections are laterally offset from each other so that they can be interleaved with each other. In this example, some of the projections 30', 31' are A-shaped with two legs 32, and other projections 30", 31" have a single leg 33. The projections of each row have elongated rod holes 34, 35 that form a lateral passageway with the aligned holes of the interleaved projections, or hinge eyes, of adjacent modules. A hinge rod 36 is received in the passageway to connect adjacent belt rows together at a hinge joint 38.

Figure 2:
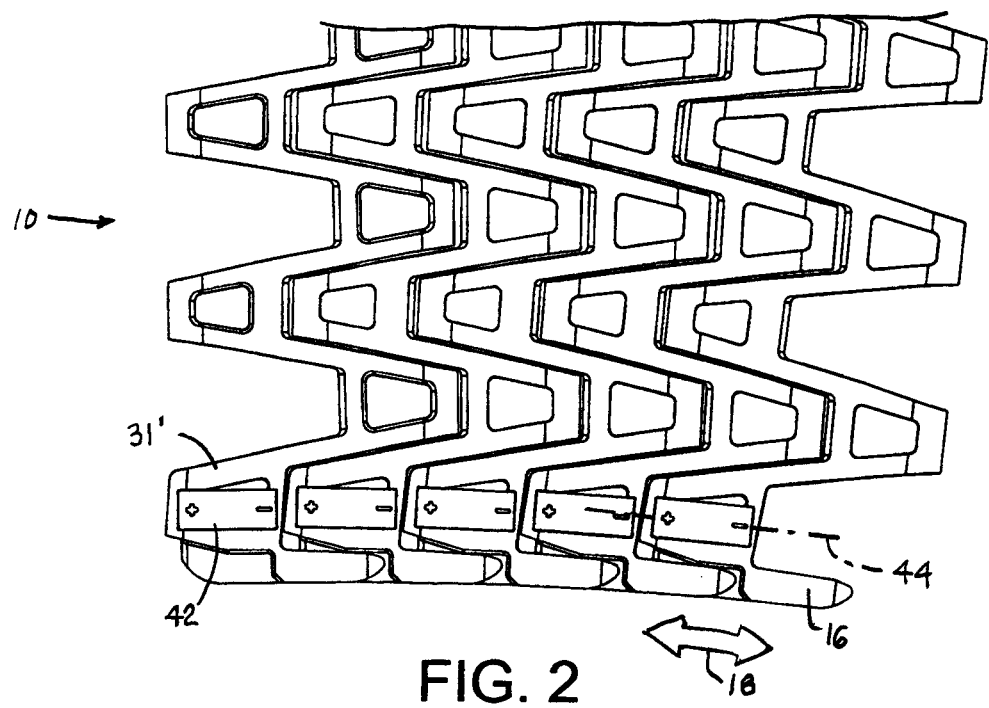
FIG. 2 is a top plan view of one edge of the conveyor belt of FIG. 1 at the inside of a turn.
Figure 3:
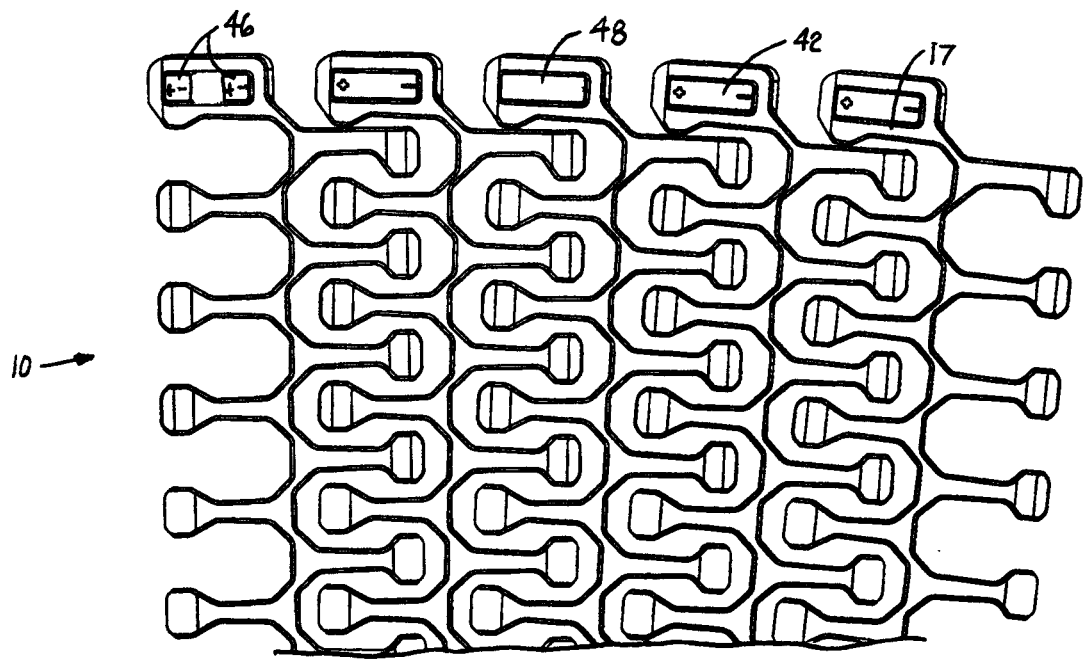
FIG. 3 is a top plan view of the opposite edge of the conveyor belt of FIG. 1 at the outside of a turn.

In a turn 13, as in FIG. 1, the inside edge 16 of the radius conveyor belt 10 travels a shorter distance than the edge 17 at the outside of the turn. The elongated rod holes 34, 35 allow the inside edges 16 of the rows to collapse at the inside of a turn as the outside edges 17 are expanded and bear all the belt tension. Because the inside edges 16 of the rows 14 bear no tension in a turn, they have a certain freedom of movement relative to each other. As the inside edges come into frictional contact with an inside rail 40 or structure on the periphery of a drive drum in a spiral conveyor, the edges can stick against the rail until the belt advances far enough to produce enough force through the belt row to overcome the friction preventing movement of the inside edge along the rail. Because no belt tension is borne by the inside edge 16, it can jump forward enough to bump into a leading belt row. A magnet 42, such as a permanent magnet, is disposed in each projection 31' at the inside edge 16 of each belt row, as shown in only two rows to avoid clutter in FIG. 1 and in all rows in the enlarged top plan view of FIG. 2. (Although the drawing shows the magnet in the projection closest to the inside of the turn, the magnet could alternatively reside in one or more projections spaced a few projections farther along the row from the inside of the turn. Thus, the term "edge" is not meant to be limited strictly to an outside border, but to a region along a belt row extending inward along the row from the outside border; and the phrase "at the edge" means "in an edge region.") The magnets 42 are arranged with their polar axes 44 parallel to the direction of belt travel 18 and with opposite poles (+, −) of adjacent rows facing each other to produce an attractive force between rows. In other words, the magnets face the same way in all the rows and produce magnetic fields that extend outward of the rows. As the inside edge 16 of the belt collapses at the inside of a turn 13, the attractive forces between the magnets of adjacent rows hold the untensioned inside belt edges together and minimize the number of impacts between inside belt edges to reduce belt vibration, which can cause conveyed articles to move out of their preferred orientation or position on the belt. As shown in FIG. 3, the magnets 42 can also be disposed at the outer side edge 17 of the belt to help reduce vibration even more or in case the belt has to negotiate turns in the opposite direction. To reduce weight, the individual magnets 42 at either edge can be replaced by pairs of aligned magnets 46 with their opposite poles facing each other, as shown in the outer side edge 17 of one of the rows of the conveyor belt in FIG. 3. It would also be possible to replace the magnets 42 in selected belt rows, such as every other row, with a paramagnetic material 48, e.g., a piece of iron, or other material that is attracted by the magnets 42 in leading and trailing magnet rows. The paramagnetic material or the magnets could also be realized by compounding paramagnetic particles or magnetic articles with thermoplastic resin and molded together to form the magnetic portion of the belt module or overmolded onto the belt module. Furthermore, not every row needs to have a magnet or paramagnetic material to reduce vibration enough in some cases. Thus, only selected rows would include a magnetic material, with all the selected rows having magnets as their magnetic material (all magnet rows), with some of the selected rows having magnets and other of the selected rows having paramagnetic materials as their magnetic materials, or with all the selected rows having a combination of magnets and paramagnetic materials. If all the rows are selected rows, then all the rows have magnetic material; otherwise, some of the rows are devoid of magnetic material.

Although the invention has been described with reference to an exemplary version, other versions are possible. For example, the magnets can be embedded permanently within the belt modules or can be detachably mounted to the modules. As another example, each row could include a magnet at the leading edge and a paramagnetic material along the trailing edge attracted by the magnet in the leading edge of the trailing row. As yet another example, electromagnets could be used instead of permanent magnets. So, as these few examples suggest, the scope of the claims is not meant to be limited to the details of the exemplary version.

What is claimed is:

1. A modular radius conveyor belt comprising:
a series of rows of one or more belt modules hingedly linked together at hinge joints extending transverse to a direction of belt travel from a first side edge of the rows to an opposite second side edge;
magnetic material disposed in selected rows;
wherein at least some of the selected rows are magnet rows in which the magnetic material in each magnet row comprises a first magnet arranged to attract the magnetic material in an adjacent selected row.

2. A modular radius conveyor belt as in claim 1 wherein all the rows are selected rows having magnetic material.

3. A modular radius conveyor belt as in claim 2 wherein the magnetic material in all the rows includes magnets.

4. A modular radius conveyor belt as in claim 1 wherein the first magnet is disposed in the first side edge of each of the magnet rows.

5. A modular radius conveyor belt as in claim 1 further comprising a second magnet disposed at the second side edge of each of the magnet rows.

6. A modular radius conveyor belt as in claim 1 wherein each of the magnet rows further comprises a second magnet aligned with the first magnet in a direction of belt travel, wherein the first and second magnets have opposite poles facing each other within the magnet row.

7. A modular radius conveyor belt as in claim 1 wherein each of the magnet rows further comprises a paramagnetic material aligned with the first magnet in a direction of belt travel.

8. A modular radius conveyor belt as in claim 1 wherein the magnetic material in the selected rows other than the magnet rows is a paramagnetic material disposed at a position to be attracted by the first magnet of an adjacent magnet row.

9. A modular radius conveyor belt as in claim 1 wherein the first magnet has a polar axis parallel to the direction of belt travel.

10. A conveyor belt module comprising:
a first hinge end and an opposite second hinge end defining respective first and second hinge axes extending transverse to a travel direction across the width of the belt module between first and second side edges;
a first magnet having a polar axis parallel to the travel direction.

11. A conveyor belt module as in claim 10 further comprising a second magnet having a polar axes aligned with the polar axis of the first magnet and wherein the first and second magnets have opposite poles facing each other.

12. A conveyor belt module as in claim 10 wherein the first magnet is disposed in the first side edge.

13. A conveyor belt module as in claim 10 wherein the first magnet is disposed at the first side edge and further comprising a second magnet disposed at the second side edge.

14. A conveyor belt module as in claim 10 further comprising a paramagnetic material aligned with the polar axis of the first magnet.

* * * * *